United States Patent [19]

Nakamura

[11] Patent Number: 5,313,602
[45] Date of Patent: May 17, 1994

[54] MULTIPROCESSOR SYSTEM AND METHOD OF CONTROL OVER ORDER OF TRANSFER OF DATA BETWEEN BUFFER STORAGES

[75] Inventor: Kouji Nakamura, Hadano, Japan
[73] Assignee: Hitachi, Ltd., Tokyo, Japan
[21] Appl. No.: 340,080
[22] Filed: Apr. 18, 1989

[30] Foreign Application Priority Data

Apr. 20, 1988 [JP] Japan ................... 63-97500

[51] Int. Cl.⁵ .................. G06F 13/00; G06F 12/06
[52] U.S. Cl. .................. 395/425; 395/250; 395/400; 364/DIG. 1
[58] Field of Search ... 364/200 MS File, 900 MS File; 395/250, 425, 400; 365/230.03

[56] References Cited

U.S. PATENT DOCUMENTS

| | | | |
|---|---|---|---|
| 4,503,497 | 3/1985 | Krygowski | 395/425 |
| 4,755,930 | 7/1988 | Wilson, Jr. et al. | 395/425 |
| 4,800,490 | 1/1989 | Tanaka et al. | 395/250 |
| 4,843,542 | 6/1989 | Dashiell et al. | 395/425 |
| 4,959,777 | 9/1990 | Holman, Jr. | 395/325 |
| 5,023,776 | 6/1991 | Gregor | 395/425 |

FOREIGN PATENT DOCUMENTS

61-290550 12/1986 Japan.

*Primary Examiner*—Glenn Gossage
*Attorney, Agent, or Firm*—Antonelli, Terry, Stout & Kraus

[57] ABSTRACT

A multiprocessor system includes a plurality of processors for decoding and executing instructions, a main storage, and a plurality of buffer storages for storing copies of data stored in the main storage, wherein transfer of blocks of data is performed among the plurality of buffer storages. When data required by a given one of the processors is absent from the nearby buffer storage, a block address at which the data block including the required data is located and an intra-block address at which the required data is located in the data block are sent out to another buffer storage, where decision is made on the basis of the intra-block address as to which data is required by the processor requiring the data, whereupon the required data is transferred to the nearby buffer storage of the processor with priority over the transfer of other data in the data block including the data to be transferred. Further, when a block address and an intra-block address are received by a buffer storage from another buffer storage, a decision is made as to whether the data block has been previously rewritten, and the requested data is transferred to the other buffer storage only if the data block has been previously rewritten.

5 Claims, 5 Drawing Sheets

MULTIPROCESSOR SYSTEM AND METHOD OF CONTROL OVER ORDER OF TRANSFER OF DATA BETWEEN BUFFER STORAGES

BACKGROUND OF THE INVENTION

The present invention relates generally to a buffer storage control technique for a computer system, and more particularly to a buffer storage control technique for allowing data transfer among the buffer storages of a multi-processor system which includes a plurality of the buffer storages.

In general, a computer system includes a high-speed instruction processor, a main storage of low-speed and large capacity and one or more buffer storages of high-speed and small capacity. The computer system can perform operations at high speed due to combined use of the high-speed instruction processor, and a two-level hierarchical arrangement of the storages inclusive of the main storage and the buffer storages. More specifically, in a computer system equipped with a buffer storage, the main storage data which is used at a high frequency is stored in the buffer storage so that the desired data can be obtained by consulting the buffer storage, with a view to reducing the effective main storage access time and thereby enhancing the processing capability of the processor. The main storage is constituted by a dynamic RAM (Random Access Memory) which is commonly implemented by metal oxide semiconductor (MOS) transistors. On the other hand, the buffer storage is constituted by a static RAM which is usually implemented by bipolar transistors.

Besides the two-level hierarchical storage arrangement, it is equally possible to implement a multi-level hierarchical memory structure by providing additional storage devices. As a storage method for a memory of hierarchical structure, there can generally be mentioned a store-through method according to which updating of data at a given level is immediately followed by the updating of data at lower levels and a store-in method according to which data of a low level is updated at the time when the updated data of higher level is returned to the low level.

Although the present invention is applicable to both store-through and store-in type systems, the following description will be made on the assumption that the invention is applied to a store-in type computer system.

In a store-in type computer system, it is noted that, when a relevant block exists in buffer storage upon occurrence of a store request, data in that block in the buffer storage is rewritten and returned to the main storage when that block is to be replaced.

Heretofore, in a multi-processor system including a plurality of buffer storages implemented in the store-in scheme, addresses of blocks, each representing a unit for handling a series of data in the buffer storage, are transmitted for effecting data transfer among the buffer storages for the purpose of realizing a coincidence in the control of the buffer storages. More specifically, when desired data is absent from a given one of the buffer storages, the relevant block address is sent out to another buffer storage, whereon a decision is made as to whether or not the relevant block exists in the other buffer storage. In case the relevant block exists in the other buffer storage, and when the content thereof is different from that of the main storage because of having been rewritten, data of that block is transferred to the buffer storage in which the data request originates, to be stored therein. This type of buffer storage control system is disclosed, for example, in JP-A-61-290550.

In the case of the prior art buffer storage control system, no consideration is given to the sequence in which the data within the block is transferred at the time of data transfer between the buffer storages on a block basis, and so the transfer typically is carried out starting from the leading data. Accordingly, when the data required by a processor exists at a rear or trailing area in the block, there results a delay in the transmission of the required data to the processor from the buffer storage to which the data request is issued, giving rise to a problem.

SUMMARY OF THE INVENTION

An object of the present invention is to prevent or mitigate the delay involved in the data transmission to a data requesting processor by carrying out efficiently a data transfer between buffer storages in a multi-processor system including a plurality of buffer storages.

The present invention is concerned with a buffer storage control technique for a multi-processor system which includes a memory or storage system having a hierarchical arrangement in which data transfer can be performed between the buffer storages.

The buffer storage control for the multi-processor system according to the present invention is realized in such a manner that when data required by a processor is not present in a given one of the buffer storages, the address of a block containing the data of concern is sent out to another one of the buffer storages together with intra-block addresses of that block. When the block of concern exists in the other buffer storage, and if the content of that block has been rewritten, presenting a discrepancy from the content of the main storage, it is then decided with the aid of the block address which of the data within the block is requested by the processor, whereon the requested data is transferred to the processor with priority together with information indicating which data in the block is being sent.

More specifically, the buffer storage to which an access request is issued by a processor makes a decision as to whether the data as requested is present in this buffer storage itself. If not present, the whole access address is sent out to another buffer storage where the block address of the access address sent thereto is used to decide whether the block of concern is present or not and, if present, then a decision is made as to whether or not the content of that block has been rewritten. If rewritten, the data is read out from that block according to the address sent from the origin or sender buffer storage, whereupon the intra-block address of that block is sequentially incremented according to the width of data read out from the buffer storage. At that time, overflow is neglected. The data read out from the buffer storage is sent to the sender or origin buffer storage together with the intra-block address information. The origin buffer storage then generates an address for writing the data therein on the basis of the intra-block address and makes a decision as to whether the data is to be transferred to the processor or not.

In this manner, the required data can be sent containing the required data out to the processor with priority being given to the block. By virtue of the transfer of the intra-block address together with the data from the other buffer storage, data storage as well as data transfer to the processor can be accomplished without any obstacles by the sender buffer storage, whereby erroneous operation can be positively excluded.

According to the buffer control technique for the multi-processor system of the present invention, even the required data located at a rear or trailing portion of the block can be sent to the sender or origin buffer storage with priority, whereby the processing capability of the multi-processor system can be enhanced significantly.

DESCRIPTION OF THE PREFERRED EMBODIMENTS

Now, the invention will be described in detail in conjunction with a preferred and exemplary embodiment by reference to the drawings on the assumption that two buffer storages are employed, by way of example only.

Figure 1:
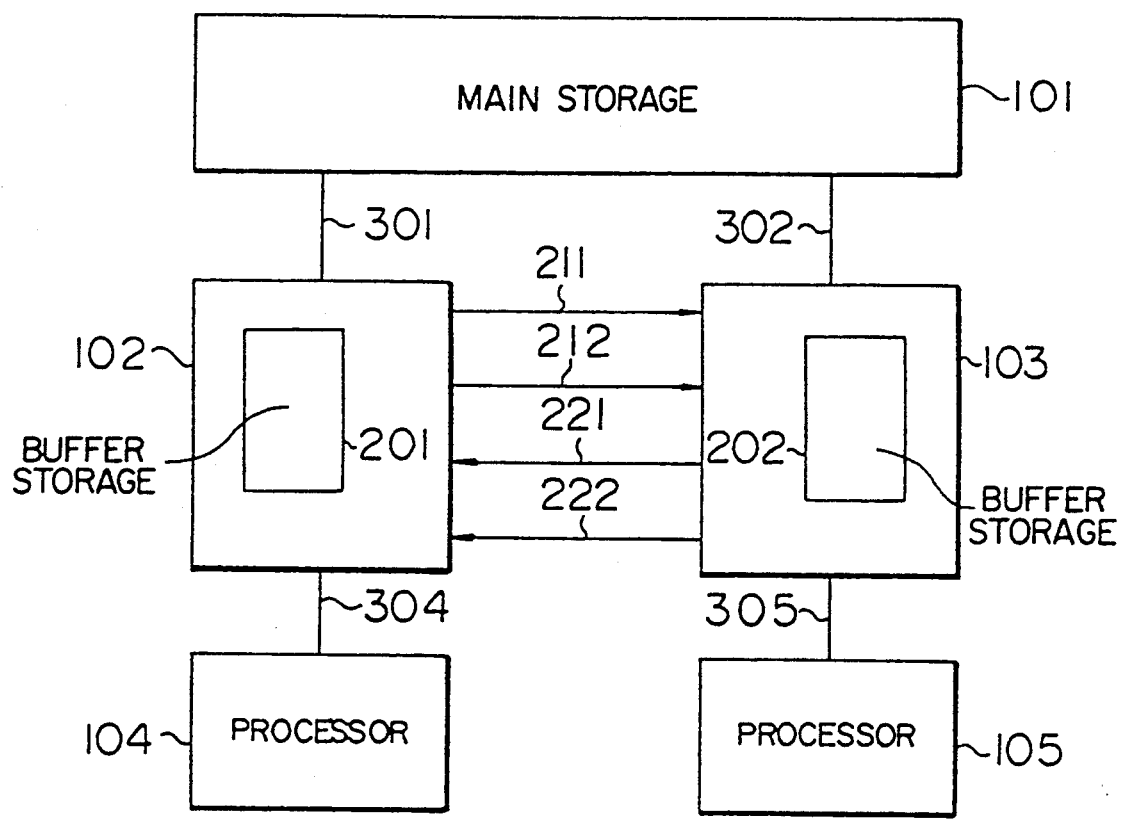
FIG. 1 is a block diagram showing a buffer storage control method and apparatus for a multi-processor system according to an exemplary embodiment of the present invention.

FIG. 1 is a block diagram for illustrating operation of an apparatus for carrying out the buffer storage control method according to an embodiment of the present invention. Referring to FIG. 1, there are connected to a main storage 101, a buffer controller 102 including a buffer storage or buffer storage 201 and a buffer controller 103 including a buffer storage 202. The buffer storages 201 and 202 are controlled in accordance with the store-in method mentioned hereinbefore. Connected to the buffer controller 102 is a processor 104 which operates to decode and execute instructions. Similarly, a processor 105 is connected to the buffer controller 103.

Figure 5:
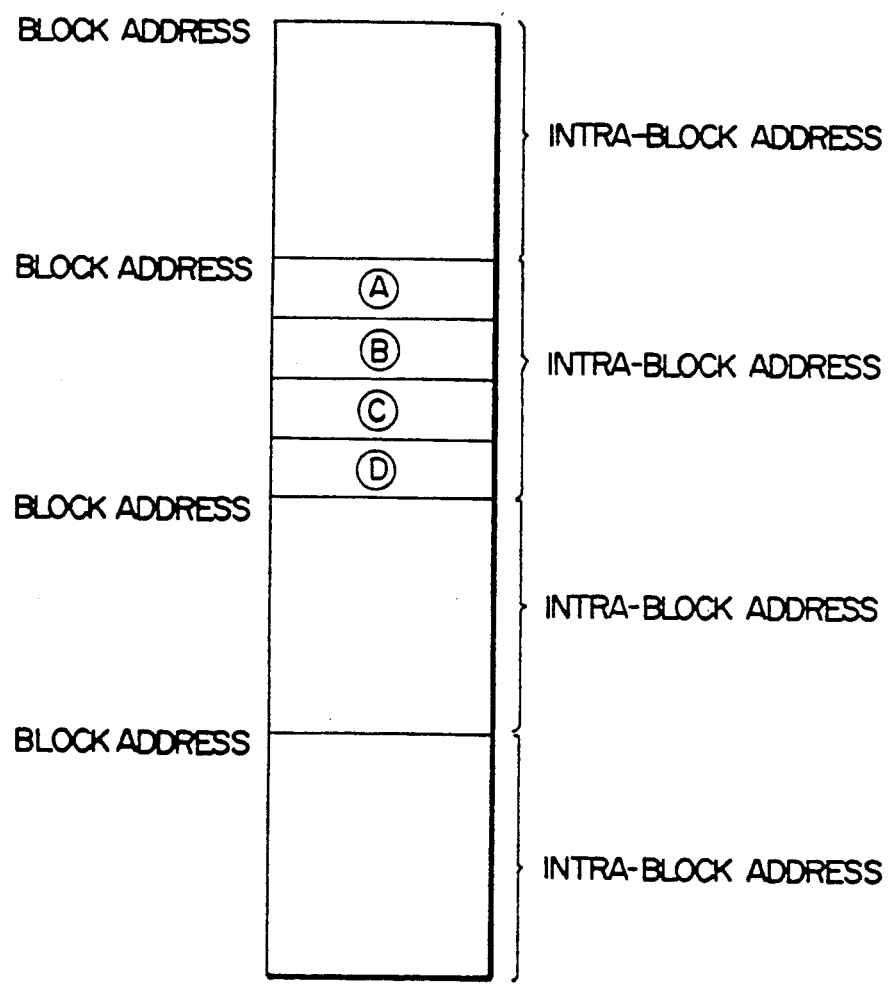
FIG. 5 is a schematic diagram showing a relationship between block addresses of data and intra-block addresses.

Suppose that the processor 104 issues a request for an instruction or operands (hereinafter collectively referred to as data) to the buffer controller 102. The request is designated by a data address of the main storage 101. In the buffer controller 102, a decision is made on the basis of the address as to whether or not the requested data exists in the buffer storage 201. If the data is present in the buffer storage 201, it is read out from the buffer storage 201 to be sent to the processor 104. Otherwise, the buffer controller 102 issues to the main storage 101 a request for transfer of a block including the data of concern and at the same time issues a buffer storage coincidence control request to the other buffer controller 103. At that time, the buffer controller 102 sends the block address 211 of the block including the data of concern as received from the processor 104 together with an intra-block address 212 for that data. The relation between the block address and the intra-block address can be seen in FIG. 5.

When the block as requested is absent from the buffer storage 201 or when the block that exists in the buffer storage 201 has not been rewritten and coincides with the content of the main storage 101, the buffer storage controller 102 fetches the block from the main storage 101 and places it in the buffer storage 201 while sending the request data to the processor 104 as in the case of the prior art system.

On the other hand, when the block of concern exists in the buffer storage 202 with the content thereof having been rewritten, resulting in the content of that block not being coincident with that of the main storage 101, the buffer controller 103 has to send the block of concern in the buffer storage 202 to the buffer storage 201. With the present invention, it is an objective to perform efficiently this block transfer efficiently. Now, the scheme adapted by the invention will be explained with reference to FIGS. 2 to 4 on the assumption, by way of example only, that one block of the buffer storage consists of 32 bytes and that the data width which can be read out from the buffer storage at one time is 8 bytes. It is further assumed that the data request by the processor to the buffer controller is made on an eight-byte basis. Additionally, each data transfer between the main storage and the buffer storage, between the buffer storages and between the buffer storage and the processor, respectively, is carried out on an eight-byte basis.

Figure 2:
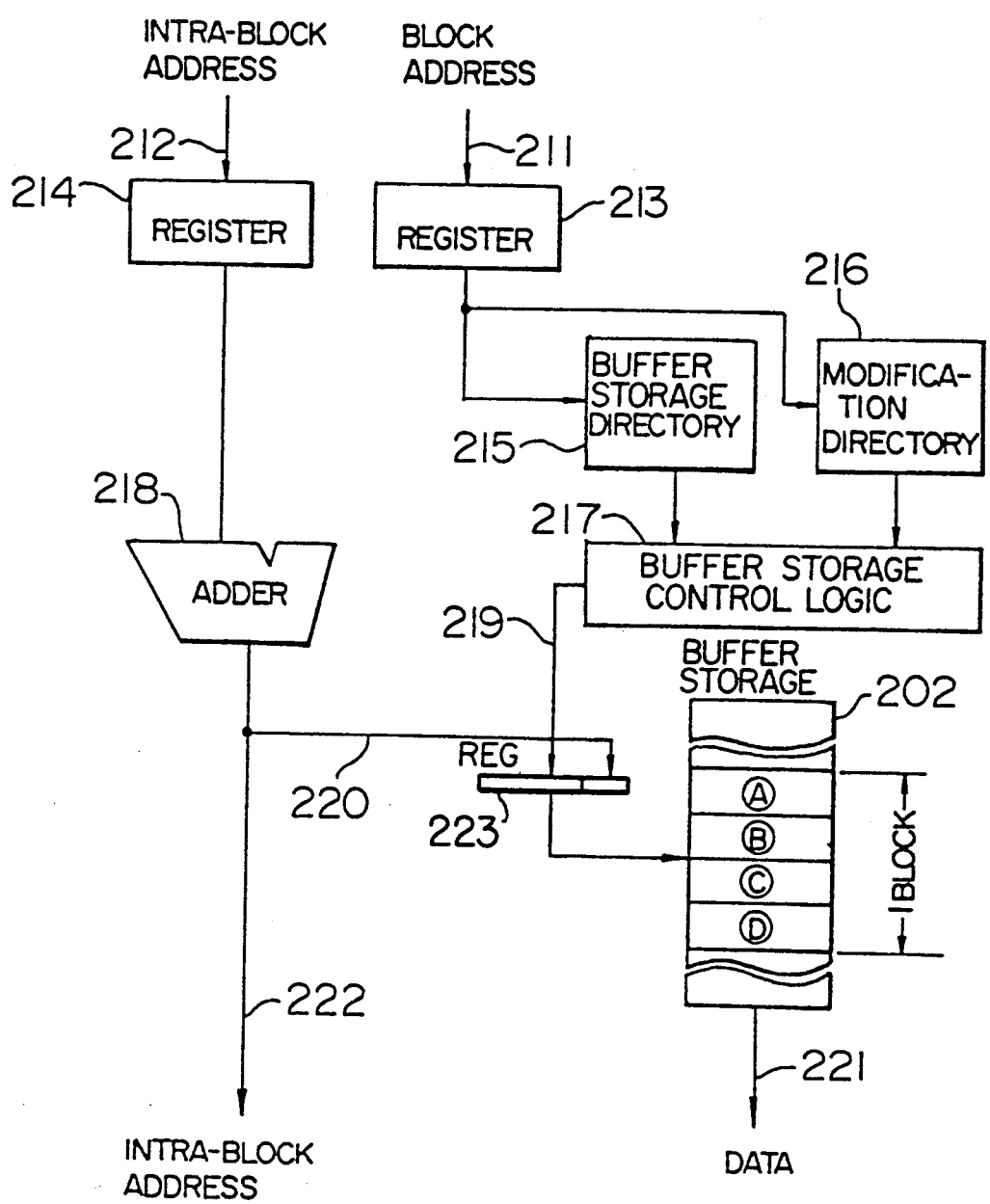
FIG. 2 is a schematic diagram for illustrating operation of a buffer for a destination buffer storage to which a coincident control request is issued.

FIG. 2 shows in detail a configuration of the buffer controller 103 shown in FIG. 1. More specifically, FIG. 2 shows an internal structure of the buffer controller 103 to an extent necessary for understanding the operation performed when the data required by the processor 104 is absent from the buffer storage 201 while the buffer controller 102 issues a coincidence control request.

The block address as well as the intra-block address sent out from the buffer controller 102 are supplied to a block address register 213 and an intrablock address register 214 incorporated in the buffer controller 103 over address lines 211 and 212, respectively. In the buffer controller 103, the block address stored by the register 213 is utilized for accessing a buffer storage directory 215 holding the main storage address of the block existing in the buffer storage 202 to thereby make a decision as to whether or not the block of concern exists in the buffer storage 202. When the block is present, a modification directory 216 is accessed which contains record information indicating whether or not writing has been performed in each block within the buffer storage 202. On the basis of the results of the accesses to the buffer storage directory 215 and the modification directory 216, a buffer storage control logic unit 217 makes a decision as to whether or not the transfer on a block basis is to be performed from the buffer storage 202 to buffer storage 201.

In case the block of concern exists in the buffer storage 202 with the content thereof having been rewritten, a read request on a block basis is issued to the buffer storage 202. At that time, the address of the block in the buffer storage 202 is designated by an address line 219. Additionally, the intra-block address stored by the intra-block address register 214 is designated by an address line 220. The addresses on the address lines 219 and 220 are concotenated in a register 223 for reading out the data from the buffer storage 202. The data as read out is transferred to the buffer controller 102 over a data line 221 and at the same time the intra-block address as used is also transferred to the buffer controller 102 through an address line 222.

Reading of one block (32 bytes) from the buffer storage 202 can be realized by incrementing the intra-block address by +8, +16 and +24 sequentially. At that time, any overflow of the intra-block address is neglected. Assuming, for example, that one block is composed of four data limits A, B, C and D each of 8 bytes, as is shown in FIG. 2, and that the requested data is the third data units C, the first intra-block address is then "10000" in the binary notation. Thus, this address is first used for reading the buffer storage 202. Subsequently, the read-out operation is performed by updating the intra-block address to "11000", "00000" and then to "01000", whereby the 8-byte data can be read out for transfer in the order of C, D, A and B. The updating of the intra-block address can be realized by the count-up operation of an adder 218.

Figure 3:
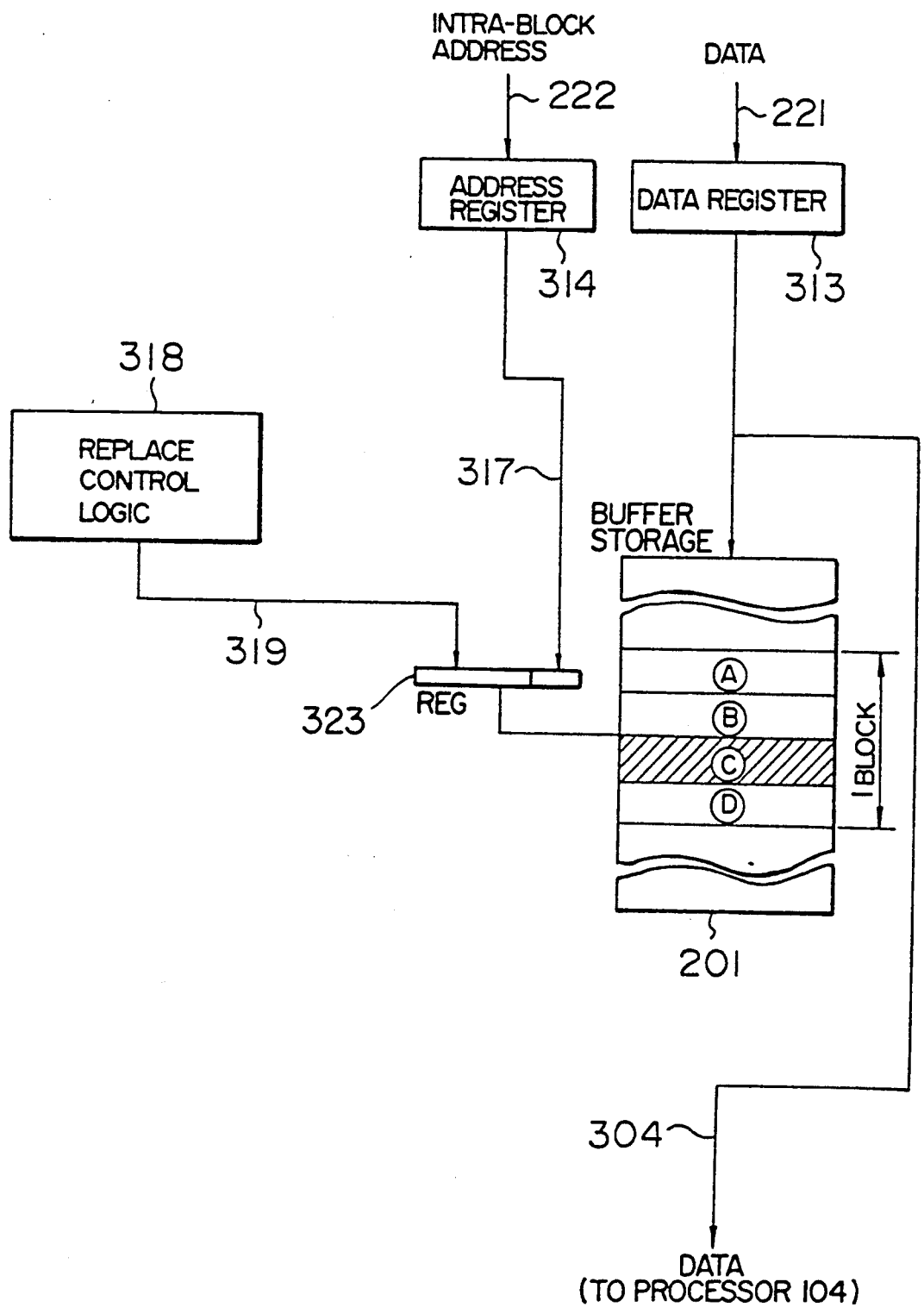
FIG. 3 is a schematic diagram for illustrating operation of a buffer for a sender buffer storage from which the coincident request is issued.

FIG. 3 shows in detail a configuration of the buffer controller 102. More specifically, this figure shows a structure of the buffer controller 102 to an extent necessary for understanding the operation performed upon reception of the intra-block address transferred from the buffer controller 103 and the data read out from the buffer storage 202.

The data (8-byte data) from the buffer controller 103 is transferred to a data register 313 through a data line 221. The intra-block address is transferred to an address register 314 over an address line 222. In case the required block is not present in the buffer storage 201, the buffer controller 102 outputs a block address buffer storage as outputted by the replace control logic 318 onto an address line 319 and an intra-block address as outputted by the address register 314 onto an address line 17. The block address and intra-block address are stored in register 323 and are used to access for the buffer storage 201, whereby the data fetched by the data register 313 is sequentially written in the buffer storage 201. The replace control logic 318 determines which of the blocks in the buffer storage 201 is to be replaced. In the case of the illustrated embodiment, the data is written in the relevant block of the buffer storage 201 in the order of data units C, D, A and B. Since the data unit C transferred first is the data required by the processor 104, the data unit C is immediately sent to the processor 104 over the data line 304.

Although the description has been made of the buffer storage controllers separately by referring to FIGS. 2 and 3, it should be understood that one and the same buffer storage controller may serve for both the functions illustrated in FIGS. 2 and 3.

Figure 4:
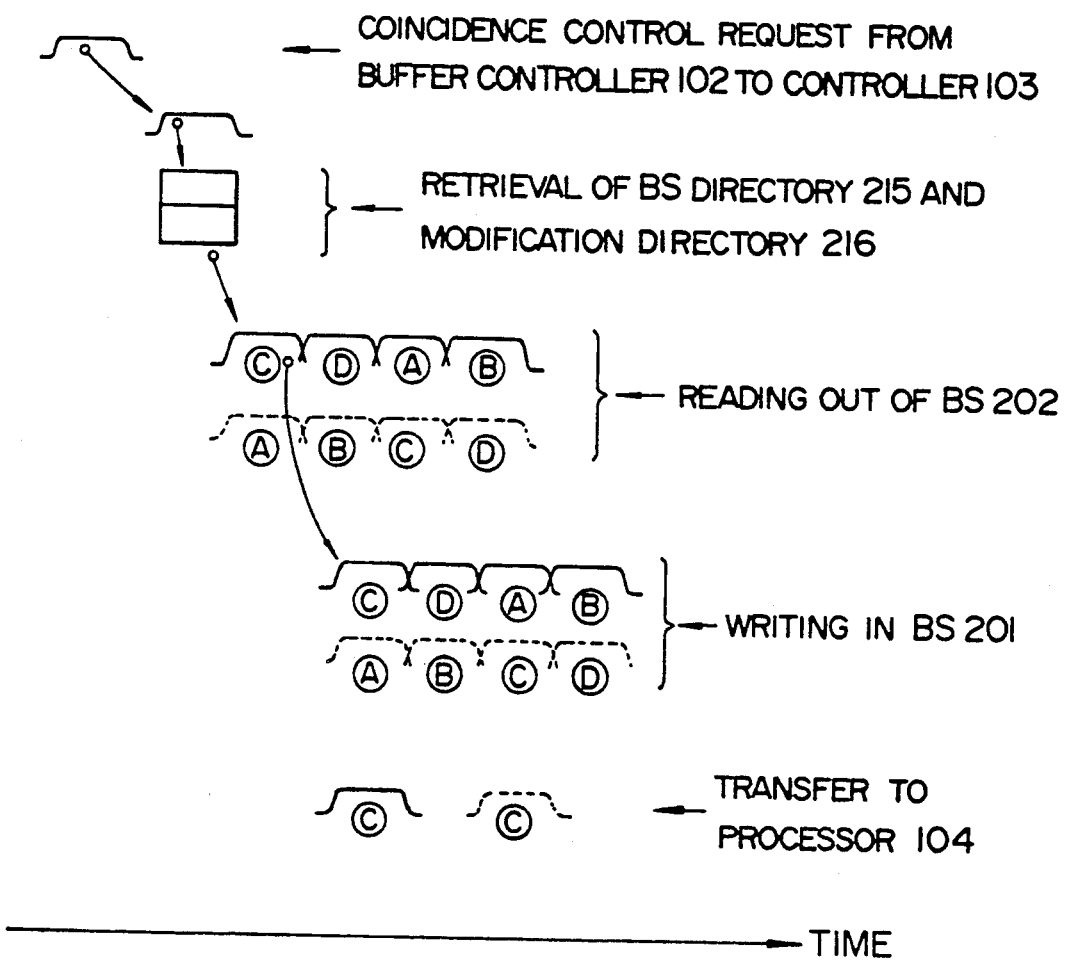
FIG. 4 is a timing chart for illustrating operation of the inventive system comparatively with that of a prior art system.

FIG. 4 shows a timing chart for illustrating operation of the embodiment described above. In FIG. 4, the time relation in the case of the embodiment of the invention is shown in solid lines, while that of the prior art system is shown in broken lines, for the purpose of comparison. As will be seen in this figure, the data unit C required by the processor 104 can be sent thereto faster by two unit times than the prior art.

Incidentally, the inter-buffer storage data transfer may be performed directly between the buffer storages or alternatively by way of a higher-level storage (main storage in the case of the illustrated embodiment).

In the description of FIG. 1, it has been assumed that two processors and two buffer storages are provided. However, it should be appreciated that the present invention can be applied to a system in which more than two processors and buffer storages are employed.

As will be appreciated from the foregoing description, it is possible according to the teaching of the invention to send the required data to the data requesting processor at a high speed as compared with the prior art system in a case where the data is transferred between the buffer storages, as a result of which the decoding and execution of an instruction by the processor can be correspondingly speeded up.

I claim:

1. A method of controlling a plurality of buffer storages in a multi-processor system which includes a plurality of processors for decoding and executing instructions, a main storage, said plurality of buffer storages for storing copies of data stored in said main storage, and a plurality of buffer storage control means each connected to a respective one of said plural processors and including a respective one of said buffer storages for controlling said respective one of said buffer storages and for performing data transfer with other buffer storage control means, said method comprising:

a step at which, when data required by a given one of said processors is absent from the buffer storage controlled by the buffer storage control means connected to said given one if said processors, a block address at which a data block including said required data is located and an intra-block address at which said required data is located in said data block are sent to another buffer storage control means from said buffer storage control means connected to said given one of said processors;

a step of retrieving said data block including said required data from the buffer storage in said another buffer storage control means using said block address from said buffer storage control means connected to said given one of said processors;

a step of deciding at which intra-block address said required data is located in said data block in said buffer storage in said another buffer storage control means using said intra-block address;

a step of transferring said required data to the buffer storage control means connected to said given one of said processors with priority over other data included in the same data block with said required data;

a step of transferring address information together with said required data to the buffer storage control means connected to said given one of said processors from said another buffer storage control means, said address information indicating from which data block said required data is being transferred; and a step of storing said required data in the buffer storage in said buffer storage control means connected to said given one of said processors.

2. A method of controlling a plurality of buffer storages in a multi-processor system which includes a plurality of processors for decoding and executing instructions, a main storage, said plurality of buffer storages for storing copies of data stored in said main storage, and a plurality of buffer storage control means each connected to a respective one of said plural processors and including a respective one of said plural buffer storages for controlling said respective one of said buffer storages and for performing data transfer with other buffer storage control means, said method comprising:

a step at which, when data required by a given one of said processors is absent from the buffer storage controlled by the buffer storage control means connected to said given one of said processors, a block address at which a data block including said required data is located and an intra-block address at which said required data is located in said data block are sent to another buffer storage control means from said buffer storage control means connected to said given one of said processors;

a step of searching a buffer storage directory holding main storage addressed by using the block address from said buffer storage control means connected to said given one of said processors to thereby decide whether said required data is stored in the buffer storage in said another buffer storage control means;

a step of searching a modification directory containing information indicating whether a write operation has been performed on data blocks in the buffer storage in said another buffer storage control means;

a step of deciding by buffer storage control logic means whether data transfer is to be performed, on the basis of results of searches of said buffer storage directory and said modification directory in said another buffer storage control means;

a step of transferring said required data to said buffer storage control means connected to said given one of said processors by updating said intra-block address sent to said another buffer storage control means;

a step of transferring address information together with said required data to the buffer storage control means connected to said given one of said processors with priority over other data included in the same data block with said required data, said address information indicating from which data block said required data is being transferred; and a step of storing said required data in the buffer storage in said buffer storage control means connected to said given one of said processors.

3. A multi-processor system, comprising a plurality of processors for decoding and executing instructions, a main storage, a plurality of buffer storages for storing copies of data stored in said main storage, and a plurality of buffer storage control means each connected to a respective one of said plural processors and including a respective one of said plural buffer storages for controlling a respective one of said buffer storages and for performing data transfer with other buffer storage control means, wherein when data required by a given one of said processors is absent from the buffer storage controlled by the buffer storage control means connected to said given processors, a block address, at which a data block including said required data is located and an intra-block address at which said required data is located within said data block, to another buffer storage control mans from said buffer storage control means connected to said given one of said processors, and wherein in said another buffer storage control means, a decision is made using said intra-block address as to which data is required by said given one of said processors, said required data and the intra-block address being transferred to the buffer storage control means connected to said given one of said processors with priority over other data included in the data block with said required data.

4. A multi-processor system according to claim 3, wherein each of said other buffer storage control means includes:

a block address register coupled to a respective buffer storage control means for storing block addresses;

an intra-block address register coupled to said respective buffer storage control means for storing intra-block addresses;

a buffer storage directory holding main storage addresses of data existing in another buffer storage and receiving the block address and the intra-block means connected to said respective buffer storage control means connected to said given one of said processors for thereby deciding whether the required data exists in said another buffer storage;

a modification directory for receiving holding information from said buffer storage directory indicating whether a write-in operation has been performed on data blocks in said another buffer storage;

buffer storage control logic means for deciding whether data transfer to said respective buffer storage control means connected to said given one of said processors is to be performed, on the basis of results of retrievals of said buffer storage directory and said modification directory; and an adder for updating an intra-block address in said intra-block address register.

5. A multi-processor system according to claim 3, wherein the buffer storage control means connected to said given one of said processors includes replace control logic means for determining which data block in the buffer storage associated with the buffer storage control means connected to said given one of said processors is to be replaced.

* * * * *